United States Patent [19]
Michon

[11] Patent Number: 5,317,407
[45] Date of Patent: May 31, 1994

[54] FIXED-PATTERN NOISE CORRECTION CIRCUITRY FOR SOLID-STATE IMAGER

[75] Inventor: Gerald J. Michon, Waterford, N.Y.

[73] Assignee: General Electric Company, Pittsfield, Mass.

[21] Appl. No.: 900,504

[22] Filed: Jun. 17, 1992

Related U.S. Application Data

[63] Continuation of Ser. No. 667,113, Mar. 11, 1991.

[51] Int. Cl.$^5$ .................. H04N 3/14; H04N 5/335
[52] U.S. Cl. .................................................. 348/306
[58] Field of Search ............... 358/213.18, 213.15, 358/213.11, 213.23, 213.13, 213.26, 213.31

[56] References Cited

U.S. PATENT DOCUMENTS

| | | | |
|---|---|---|---|
| 3,763,480 | 10/1973 | Weimer | 340/173 R |
| 3,819,958 | 6/1974 | Gosney | 307/304 |
| 3,993,897 | 11/1976 | Burke et al. | 250/211 J |
| 4,034,199 | 4/1977 | Lampe et al. | 235/193 |
| 4,079,423 | 3/1978 | Diehl | 358/213.18 |
| 4,241,421 | 12/1980 | Burke et al. | 365/183 |
| 4,361,839 | 11/1982 | Betterini | 370/112 |
| 4,380,755 | 4/1983 | Endlicher et al. | 358/213.15 |
| 4,511,804 | 4/1985 | Ozawa | 358/213 |
| 4,567,524 | 1/1986 | Levine | 358/213.26 |
| 4,902,886 | 2/1990 | Smisko | 358/213.15 |

Primary Examiner—Michael T. Razavi
Assistant Examiner—Joseph Colaianni
Attorney, Agent, or Firm—S. A. Young

[57] ABSTRACT

An analog line store comprises a bank of storage capacitors n in number, an n:1 read multiplexer for sequentially sampling from the n storage capacitors as part of a read-then-write operation, a 1:n write multiplexer for sequentially sampling to the n storage capacitors as a further part of the read-then-write operation, and a scanning register for generating control signals for the write multiplexer and the read multiplexer. The storage capacitors have similar capacitances that are substantially invariant with change in stored charge. Such an analog line store is integrated together with a solid-state imager array to provide for the cancellation of fixed pattern noise from the imager video output signal.

15 Claims, 7 Drawing Sheets

FIXED-PATTERN NOISE CORRECTION CIRCUITRY FOR SOLID-STATE IMAGER

This application is a continuation of application Ser. No. 07/667,113, filed Mar. 11, 1991.

The invention relates to semiconductor imagers such as those of the charge-injection-device (CID) type and, more particularly, to suppressing fixed pattern noise (FPN) in such semiconductor imagers.

BACKGROUND OF THE INVENTION

H. K. Burke and G. J. Michon describe a semiconductor imager of the charge-injection-device (CID) type in their U.S. Pat. No. 3,993,897 issued Nov. 23, 1976, entitled "SOLID STATE IMAGING APPARATUS", assigned to General Electric Company and included herewithin by reference. They also describe a semiconductor imager of the charge-injection-device (CID) type in their U.S. Pat. No. 4,241,421 issued Dec. 23, 1980, entitled "SOLID STATE IMAGING APPARATUS", assigned to General Electric Company and included herewithin by reference.

In CID image sensors that are fabricated using two levels of polysilicon, the background level signal is not absolutely flat. There is a spatial variation in the background level with no image signal present, owing to variations in threshold voltage and the interlevel capacitance from pixel-to-pixel. The interlevel capacitance varies because the dielectric is thermally grown oxide on the lower polysilicon conductors. The lower polysilicon conductors have a finite grain size, and the surface profile of the polysilicon grains is followed in the interlevel oxide, resulting in a film that is relatively uniform in thickness but non-planar in form. It is the variation from planar form that causes the variation in interlevel capacitance. This gives rise to the non-uniform, spatially-fixed background signal called fixed pattern noise. This fixed pattern noise, if not corrected, limits the sensitivity of the image sensor.

Previous apparatus corrects fixed pattern noise by reading each pixel twice, first with signal present and again after the signal has been cleared (injected). The difference between these two readings is free of fixed pattern noise within the accuracies of the readings and of the memory used to store the first reading while the second reading is being made. The memory temporarily stores a single sample of analog signal in this fixed pattern noise correction scheme. The pixel-by-pixel fixed pattern noise correction method is limited in pixel rate by the requirement that, during each scan line, each pixel be twice read and be cleared between its first and second reads.

The prior art has extended the pixel-by-pixel fixed pattern noise correction method, by reading a line of a signal is present from the CID imager and storing it for a line time interval. Then, the row is cleared of image signal and read again with only a line of fixed pattern noise present. Finally, the stored line of video and the line of just fixed pattern noise are differentially combined to recover the signal free of fixed pattern noise. The memory in such instance can be a linestore memory that stores an entire line of analog pixel values and has been implemented using a charge-coupled-device (CCD) clocked delay line. A CCD clocked delay line is difficult to make radiation-tolerant. There is a small charge transfer loss associated with each transfer of charge from one CCD clocked delay line stage to the next. The cumulative effects of these charge transfer losses begin to become significant as the number of charge transfer stages becomes appreciably large—e.g., more than fifty—leading a designer to look for a clocked analog delay line not appreciably affected by charge transfer losses. The line store method has also been implemented using two imager ports to generate dynamic updates to the fixed pattern noise.

A full frame memory has been used to store an entire frame of background fixed pattern noise samples for substraction from respective ones of the sensor output samples. The frame store method relies upon the fixed pattern noise being stable between frame store updates. A frame store for analog pixel samples can be implemented using CCD memory, with radiation-tolerance problems similar to those for a CCD clocked delay line. The frame store method requires a large memory and a method to update the fixed pattern noise frame as conditions, such as radiation-induced changes in image sensor pixel threshold voltage, change.

To avoid the problems of radiation-intolerance in CCD memory, techniques for digitizing the analog pixel samples and storing the digitized signals in digital memory have been used in the prior art. The digital memories tend to require considerably larger semiconductor die areas than analog memories, and errors are introduced in the digitization procedure.

One line of video memory is required for fixed pattern noise correction in CID star sensors operated in the row readout mode. It is desirable to include this line of video memory as analog memory on the sensor integrated circuit, in order to reduce overall star sensor apparatus size. Including this analog memory on the sensor integrated circuit in a radiation-tolerant star sensor also reduces the number of parts that need to be qualified for radiation tolerance. Linear capacitors and multiplexing switches are used to implement this analog memory in the invention.

SUMMARY OF THE INVENTION

An analog line store comprises a bank of storage capacitors n in number, an n:1 read multiplexer for sequentially sampling from the n storage capacitors as part of a read-then-write operation, a 1:n write multiplexer for sequentially sampling to the n storage capacitors as a further part of the read-then-write operation, and a scanning register for generating control signals for the write multiplexer and the read multiplexer. The storage capacitors have similar capacitances that are substantially invariant with change in stored charge. Such an analog line store is integrated together with a solid-state imager array to provide for the cancellation of fixed pattern noise from the imager video output signal.

BRIEF DESCRIPTION OF THE DRAWING

In FIGS. 3, 4, and 5 the channels of MOS transistors are represented as circles crossed by lines representative of the overlying gate electrodes. In FIGS. 4 and 5 MOS transistors connected for capacitor operation are represented as half circles.

DETAILED DESCRIPTION

Figure 1:
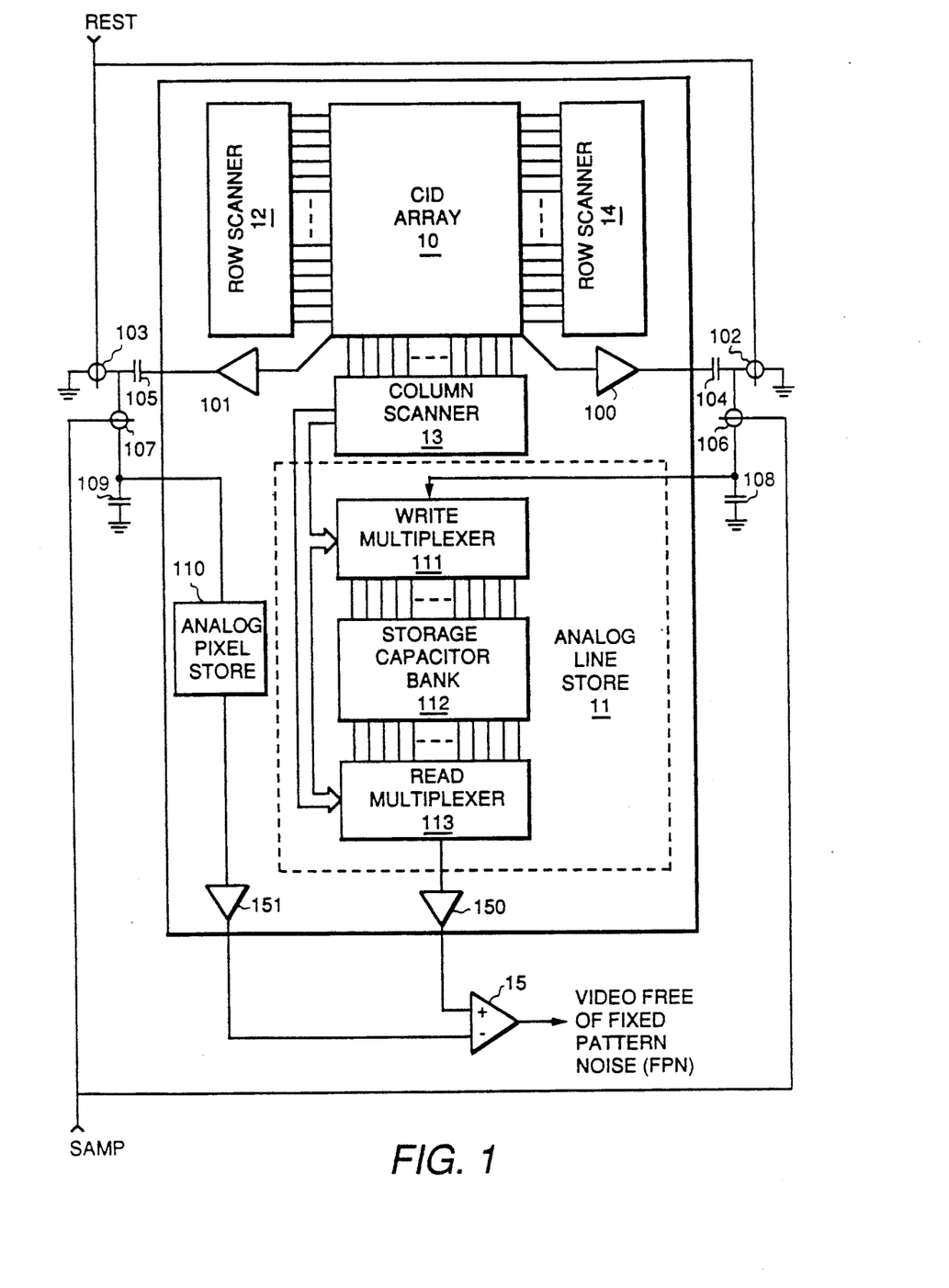
FIG. 1 is a schematic diagram of a CID semiconductor imager and attendant off-chip circuitry, embodying the invention.

A CID image sensing array 10 with on-chip timing and a line store 11 providing analog storage for fixed pattern noise correction is diagrammed in FIG. 1. A row scanner 12 selects a pair of adjacent row lines for readout. The current line, M, which has signal charge to be read out, is read out on a first output line from the CID image sensing array 10 to a voltage amplifier 100; and the previous line, M−1, which has been cleared of signal charge and has only its fixed pattern noise signature, is read out on a second output line from the CID image sensing array 10 to a voltage amplifier 101. A column scanner 13 successively selects column lines for reading out individual picture elements (pixels) in each row. A clamp scanner 14 clamps the non-selected row lines to a reference direct potential.

The voltage amplifiers 100 and 101 are provided by MOS transistors connected as common-source amplifiers, are closely matched with regard to voltage gain, and amplify their respective input signals to levels such that KTC noise in the ensuing circuitry will be negligible. The KTC noise arising within the CID image sensing array 10 is suppressed by correlated double sampling that is done off-chip. A REST first sampling pulse conditions MOS field-effect transistor switches 102 and 103 to be conductive at times appropriate for sampling KTC noise alone, to sample KTC noise from the voltage amplifier 100 to a capacitor 104 and to sample KTC noise from the voltage amplifier 101 to a capacitor 105. Thereafter, when signal samples with attendant KTC noise are available from the voltage amplifiers 100 and 101, a SAMP second sampling pulse conditions MOS field-effect transistor switches 106 and 107 to be conductive. The signal sample with attendant KTC noise from the voltage amplifier 100 less the KTC noise stored across the capacitor 104 determines the sample voltage sampled to a shunt hold capacitor 108 when transistor switch 106 is rendered conductive. The signal sample with attendant KTC noise from the voltage amplifier 101 less the KTC noise stored across the capacitor 105 determines the sample voltage sampled to a shunt hold capacitor 109 when transistor switch 107 is rendered conductive.

The successive video samples of line M as stored on the off-chip hold capacitor 108 are written to corresponding locations in the on-chip analog line store 11 just after corresponding samples of line M−1 with video signals, which were stored during read-out of the previous line pair, are read from the analog line store 11. The analog line store 11 comprises a write multiplexer 111, a bank 112 of capacitive storage devices, and a read multiplexer 113. The read multiplexer 113, responsive to selection control signals from the column scanner 13, selects which capacitive storage device of a bank 112 of capacitive storage devices is to supply a one-line-delayed video signal sample to a voltage-follower amplifier 150. The write multiplexer 111, responsive to selection control signals from the column scanner 13, re-writes the selected device in bank 112 of capacitive storage devices to store the current sample appearing on the off-chip hold capacitor 108.

The successive video samples of line M−1 as stored on the off-chip hold capacitor 109 are passed through an analog pixel store 110 before being applied to a voltage-follower amplifier 151.

A differential-input amplifier 15 differentially combines the the samples of line M−1 consisting of only components of the fixed pattern noise signature, as supplied from the voltage-follower amplifier 151, with the line M samples comprising both video and fixed pattern noise components, as supplied from the voltage-follower amplifier 150. The differential-input amplifier 15 response is free of fixed pattern noise to the degree that the two fixed pattern noise components of the output voltages of the voltage-follower amplifiers 150 and 151 match. It is presently preferred that the differential-input amplifier 15 be located on a different substrate of semiconductive material than the CID image sensing array 10, the analog line store 11 and the scanners 12-14 for reasons explained further on.

Figure 2:
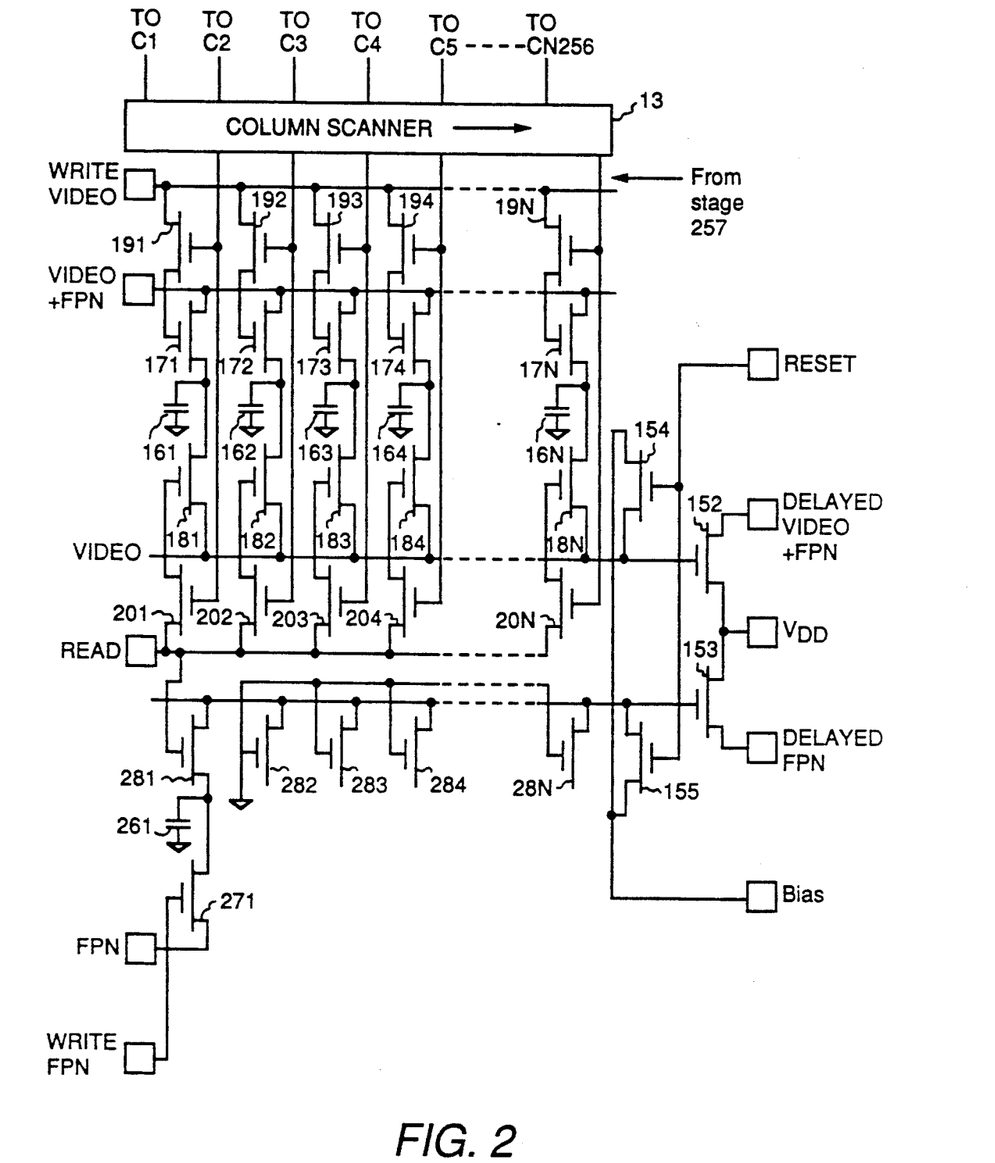
FIG. 2 is a more detailed schematic diagram of the line storage apparatus used to implement the invention.

FIG. 2 shows the bank 112 of capacitive storage devices in the on-chip analog line store 11 as comprising linear charge storage capacitors 161-16N, with the number N of storage capacitors being equal to the number of pixels in a line or row of the CID image sensing array 10. MOS transistors 171-17N are used to multiplex successive VIDEO+FPN signal samples to respective ones of the storage capacitors 161-16N, and MOS transistors 181-18N are used to multiplex successive DELAYED VIDEO+FPN signal samples from respective ones of the storage capacitors 161-16N to the gate of an MOS field-effect transistor 152, as shown in FIG. 2. The MOS field-effect transistor 152 and a similar MOS field-effect transistor 153 are connected as source followers to drive the input stage of the FIG. 1 differential-input amplifier 15. Under control of the image sensor column scanner register 13, the transistors 191-19N select WRITE VIDEO pulses to the gate of one of the transistors 171-17N, and the transistors 201-20N select READ pulses to the gate of one of the transistors 181-18N, resulting in automatic synchronization of the line store 11 to the imager readout. The size of the storage capacitors 161-16N and the video voltage levels were chosen to provide high levels of stored charge. This is done to minimize the effects of variations between multiplexer transistors and to achieve a large dynamic range.

The fixed pattern noise signature is routed through the analog pixel store 110, with somewhat less than a pixel delay, to normalize its waveshape and amplitude to that of the video samples, to help assure good cancellation of FPN in the differential-input amplifier 15. This analog pixel store 110 comprises a storage capacitor 261, an MOS transistor 271 used to multiplex the video signal samples to the storage capacitor 261, and an MOS transistor 281 used to multiplex the video signal samples from the storage capacitor 261. MOS transistors 282-28N are biased to function merely as MOS capacitors, to augment the capacitive loading MOS transistor 281 places on the gate of the source-follower transistor 153, and to make the capacitive loading on the gate of the source-follower transistor 153 substantially equal to the capacitive loading the MOS transistors 181-18N place on the gate of the source-follower transistor 152.

Between pixel samples, RESET pulses are applied to the gate electrodes of MOS transistors 154 and 155 to drive these transistors into conduction. This procedure restores direct potential levels on the gate electrodes of the source-follower transistors 152 and 153. The MOS transistors 152 and 154 of FIG. 2 correspond to the voltage-follower amplifier 150 of FIG. 1, and the MOS transistors 153 and 155 of FIG. 2 correspond to the voltage-follower amplifier 151 of FIG. 1.

Most of the available pixel time is used to read out the image signal, so that it is necessary both to write to and to read from the analog line store 11 during the subsequent pixel interval. The corrected video is consequently delayed by one pixel time from the imager video timing. An external restore/sample/hold circuit is required to maintain the pixel signal during the analog line store 11 read/write operations. Attempts to include the restore/sample/hold function on the imager chip were frustrated by the lack of sufficient time to reset the restore and sample-hold capacitors, which is necessary to prevent pixel-to-pixel cross talk. The alternative, the use of low-output-impedance amplifiers to drive the sample-hold capacitors, is difficult to implement on-chip.

Figure 3:
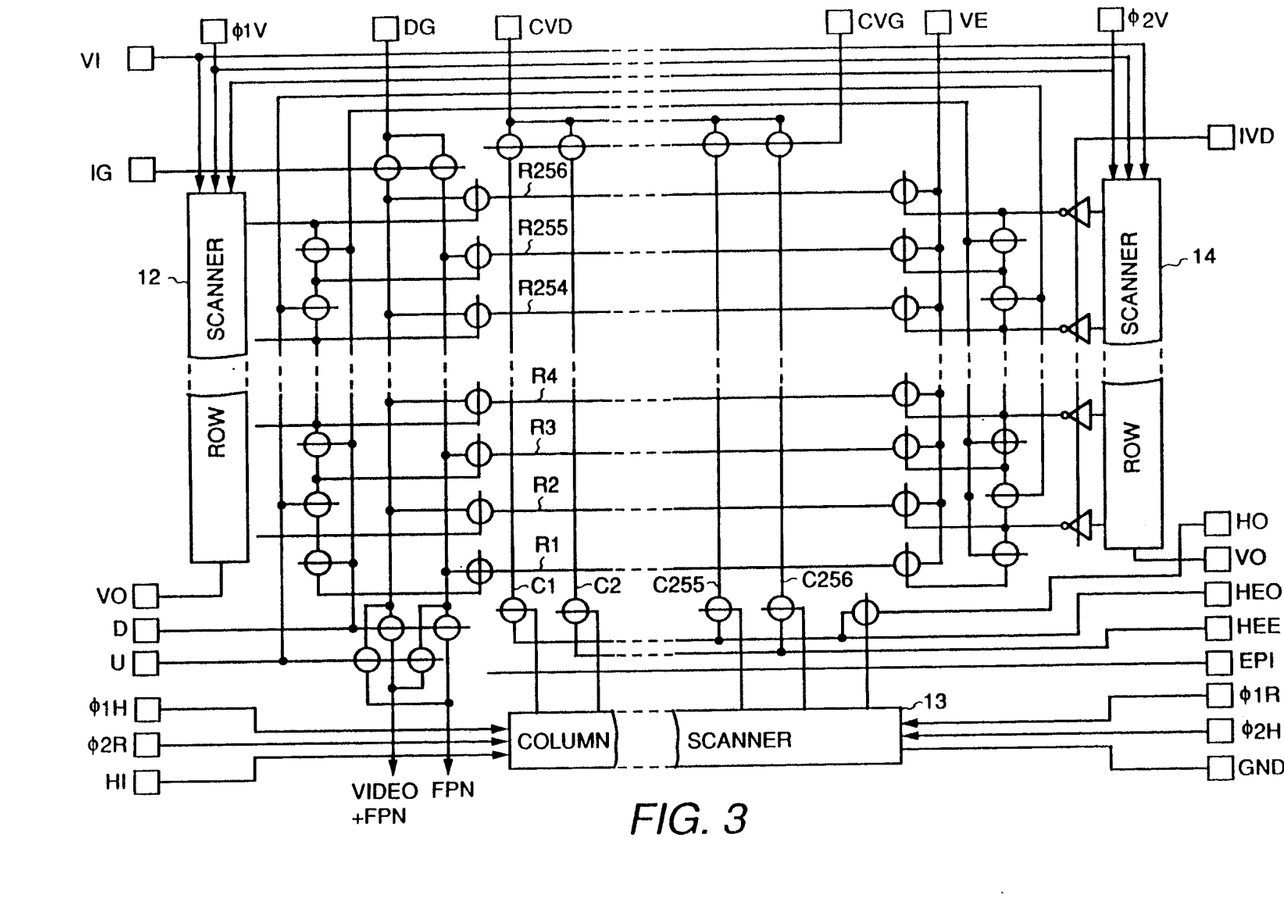
FIG. 3 is a more detailed schematic diagram of a CID image sensing array that can be used in the FIG. 1 CID semiconductor imager.

The FIG. 3 CID image sensing array is similar to the CID72 star sensor sold by General Electric Company. The FIG. 3 CID image sensing array is shown as having 256 rows and 256 columns, while the CID72 star sensor has only 92 rows and 92 columns. The alternating up (U) and down (D) signals that select the pair phasing of the row lines R1-R256 operate four MOS field effect transistors as a double-pole/double-throw switch. This d.p.d.t. switch, not found in the CID72 star sensor, commutates the selected row lines to appropriate ones of the VIDEO+FPN and FPN busses as continue into the FIG. 2 schematic diagram of the analog line store 11.

Figure 4:
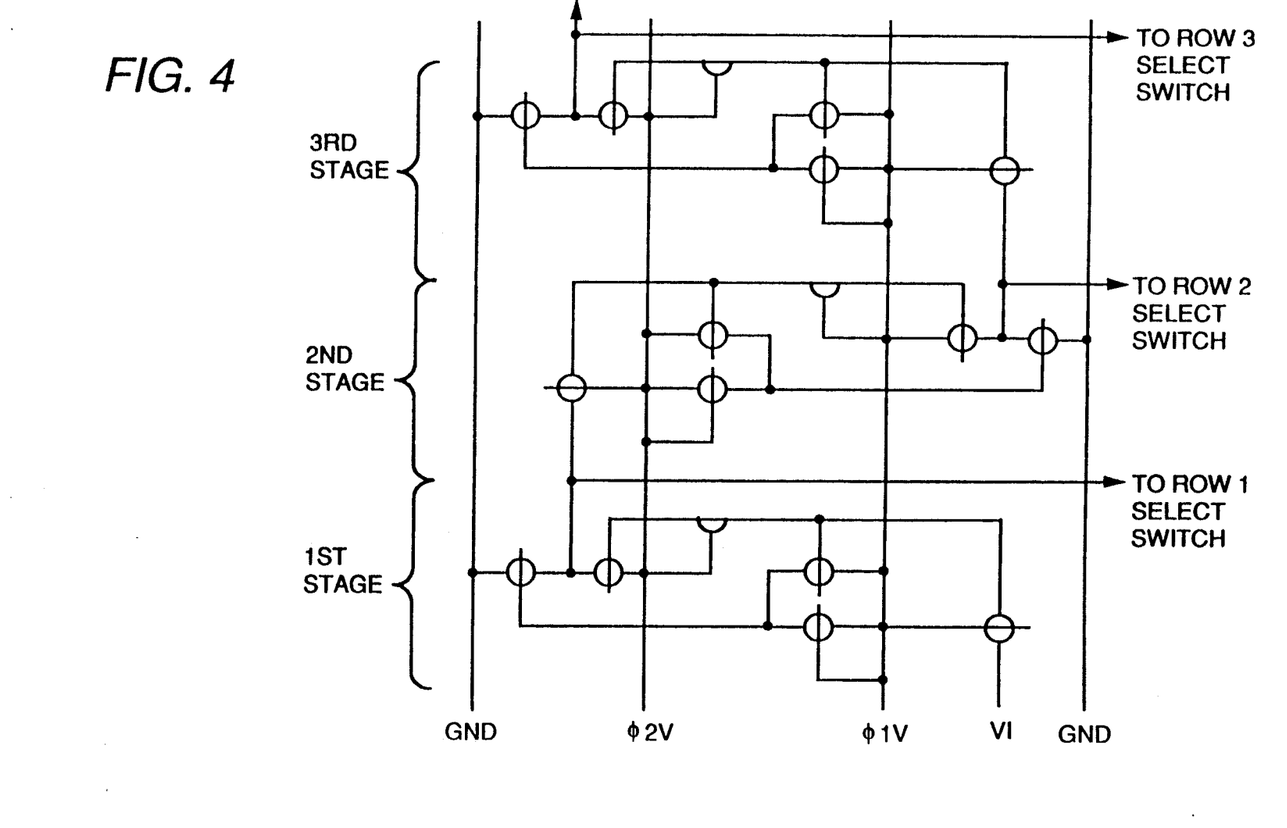
FIG. 4 is a detailed schematic diagram of three successive stages of the row scanner or clamp scanner in the FIG. 3 CID image sensing array.

As in the CID72 star sensor, the row scanner 12 and the clamp scanner 14 are similar MOS shift registers clocked two-phase by $\Phi 1$ V and $\Phi 2$ V signals. FIG. 4 shows in detail the first three stages of the row scanner 12. The first stage of the row scanner 12 differs from the later stages in that it receives a vertical input signal VI at the beginning of frame scan. The remaining stages of the row scanner 12 are alike, each successive one of them receiving $\Phi 1$ V and $\Phi 2$ V signals reversed in order of application as compared to the preceding stage.

Figure 5:
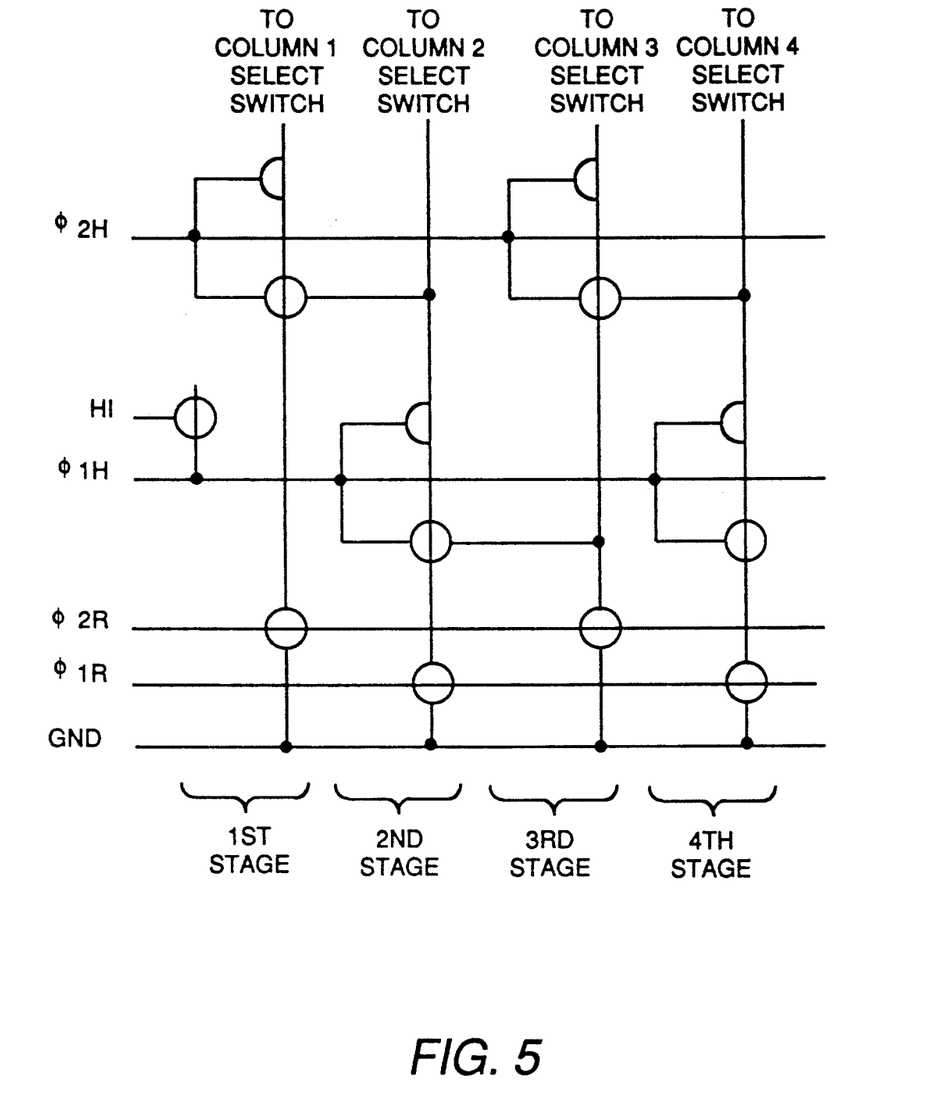
FIG. 5 is a detailed schematic diagram of four successive stages of the column scanner in the FIG. 3 CID image sensing array.

As in the CID72 star sensor, the column scanner 13 is an MOS shift register clocked four-phase by $\Phi 1H$, $\Phi 1$ R, $\Phi 2H$ and $\Phi 2$ R signals. FIG. 5 shows in detail the first four stages of the column scanner 13. The first stage of the column scanner 13 differs from the succeeding stages receiving the horizontal input signal HI at the outset of each scan line. The second stage and the third stage together are of a pattern repeated through the fourth through $257^{th}$ stages of the column scanner 13.

Figure 6:
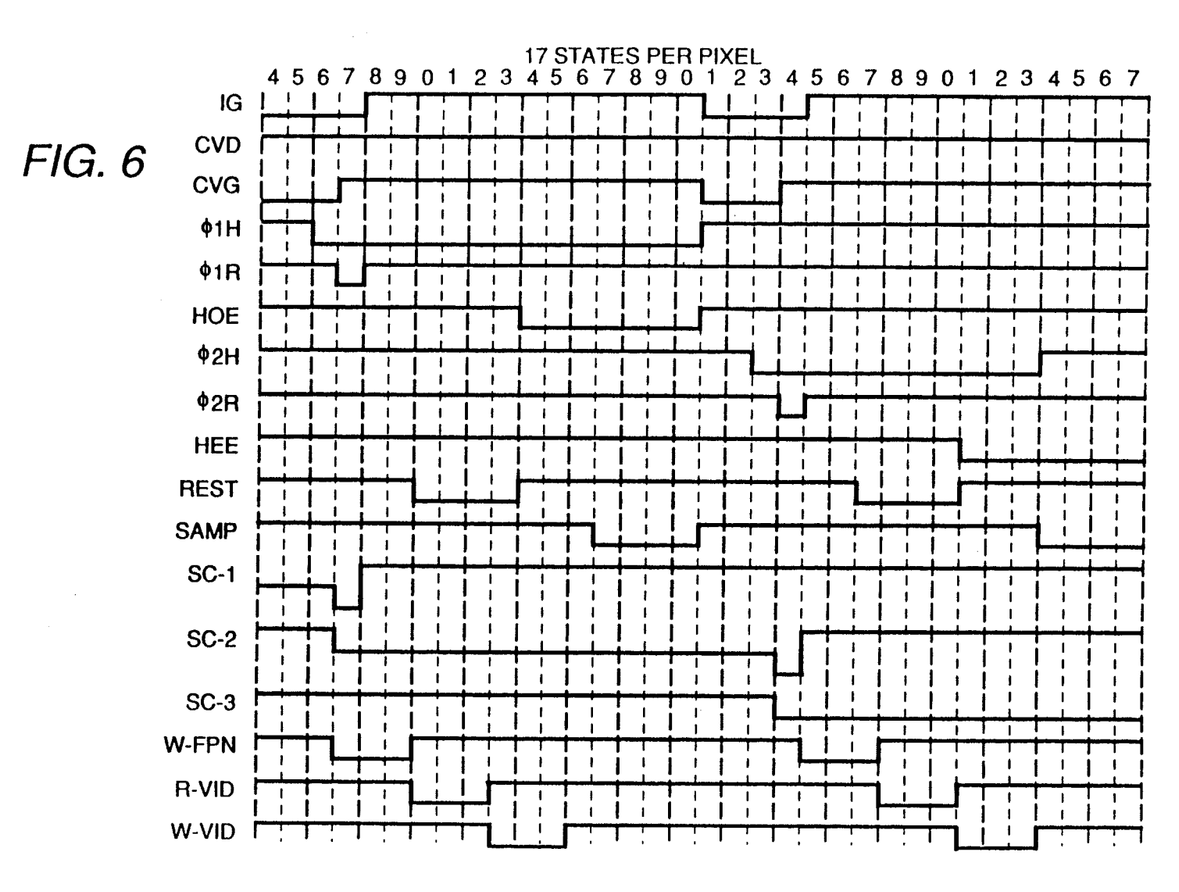
FIG. 6 is a timing diagram of signals in the CID semiconductor imager and the line storage apparatus.

FIG. 6 depicts basic timing of the FIG. 3 CID image sensing array with the analog line store 11 clock signals added as the three bottommost waveforms. These clock signals are identified as follows: Write Fixed Pattern Noise (W-FPN), Read Video (R-VID), and Write Video (W-VID). There must be no overlapping of the linestore 11 clocks; and they must occur within the time the column scanner 13 selects a column and before the occurence of the sample pulse in the SAMP signal. Linestore 11 reset is the same as the injection gate (IG) pulse used periodically, between row read outs, to clamp the FIG. 3 CID image sensing array output lines to injection drain (ID) voltage.

The semiconductor structure used to fabricate the analog line store 11 is important since it will determine the sensitivity of line store 11 to radiation effects, any fixed pattern noise generated within the line store 11, and overall dynamic range. The radiation tolerant CID process currently used in making star sensors locates the CID image sensing array 10 in a lightly-doped-n epitaxial layer grown on a p-type silicon substrate. The field barrier oxide used to separate the charge-injection devices is about $10^4$ Å thick; and about a 400 Å thick gate oxide separates the lightly-doped-n epitaxial layer and the overlying column lines formed by selectively etching from a relatively thick first polysilicon layer. The row lines which cross over the column lines are formed by selectively etching a relatively thin second polysilicon layer. The process provides for a heavily doped N+ top contact diffusion, which N+ top contact diffusion was chosen for making the common bottom plate of the linear storage capacitors 171-17N and 271. A thin, ~500. Å layer of oxide is grown on the N+ regions during the 400 Å lower polysilicon MOS transistor gate oxide growth. Heavily doped lower polysilicon gate conductors are used for the individual capacitor top plates. This structure avoids the use of oxide grown from polysilicon, which causes one component of fixed pattern noise in the image sensing array, for reasons set forth in "The Background of the Invention". This structure is also insensitive to MOS threshold voltage spatial variations, the other source of fixed pattern noise, because the capacitors are linear. A study by Shyu, Temes and Krummenmacher of random error effects in IC capacitors, "Random Error Effects in Matched MOS Capacitors and Current Sources", IEEE Journal of Solid State Circuits, Vol. SC-19, No. 6, December 1984, indicates that this structure is capable of producing capacitors matched to 0.1% when fabricated in a 1:1 ratio. The storage capacitors 171-17N and 271 are not affected by changes in MOS interface state density or charge trapped within the oxide, again because they are linear capacitors.

Another source of fixed pattern noise is variations in threshold voltage among the multiplex transistors 171-17N and 181-18N used to write into and read from the storage capacitors 161-16N. Previous measurements indicate that 12 mv standard deviation can be expected for threshold variations on <100> silicon. It does not appear that multiplex transistor threshold voltage variations will introduce significant FPN.

The use of heavily doped bottom and top capacitor plates for the storage capacitors 161-16N minimizes changes in their capacitances with voltage, which See the D. Brown et alii paper "Advanced Analog CMOS Technology", IDEM—INTERNATIONAL ELECTRON DEVICES MEETING, Washington, D.C., Dec. 14, 1985, pp. 260-263, CH2252-5/85/0000-0260 1.00 1985 IEEE results in their having highly linear transfer functions. This linearity is necessary for good fixed pattern noise correction.

There are two sources of temporal noise in the analog line store 11 in addition to the amplifier noise. These are charge partition noise and KTC noise. The charge partition noise is introduced during both writing and reading of the storage capacitors 161-16N and is calculated as 290 electrons per capacitor for each operation. The KTC noise during the write operation is 250 electrons ($C_{storage}$=0.89 pF) and 944 electrons during the output multiplexer line reset ($C_{mux}$=5.54 pF). The output multiplexer reset KTC noise can be suppressed if correlated double sampling (CDS) is used on the output signals from the analog line store 11. Without CDS, the rss noise is 1060 electrons. This noise is also introduced on the FPN store and the total noise power is doubled by the differential-input amplifier 15. The total noise works out to be 2118 electrons compared with the maximum signal level of $9 \times 10^6$ electrons, so total noise is 0.024% of maximum signal.

Figure 7:
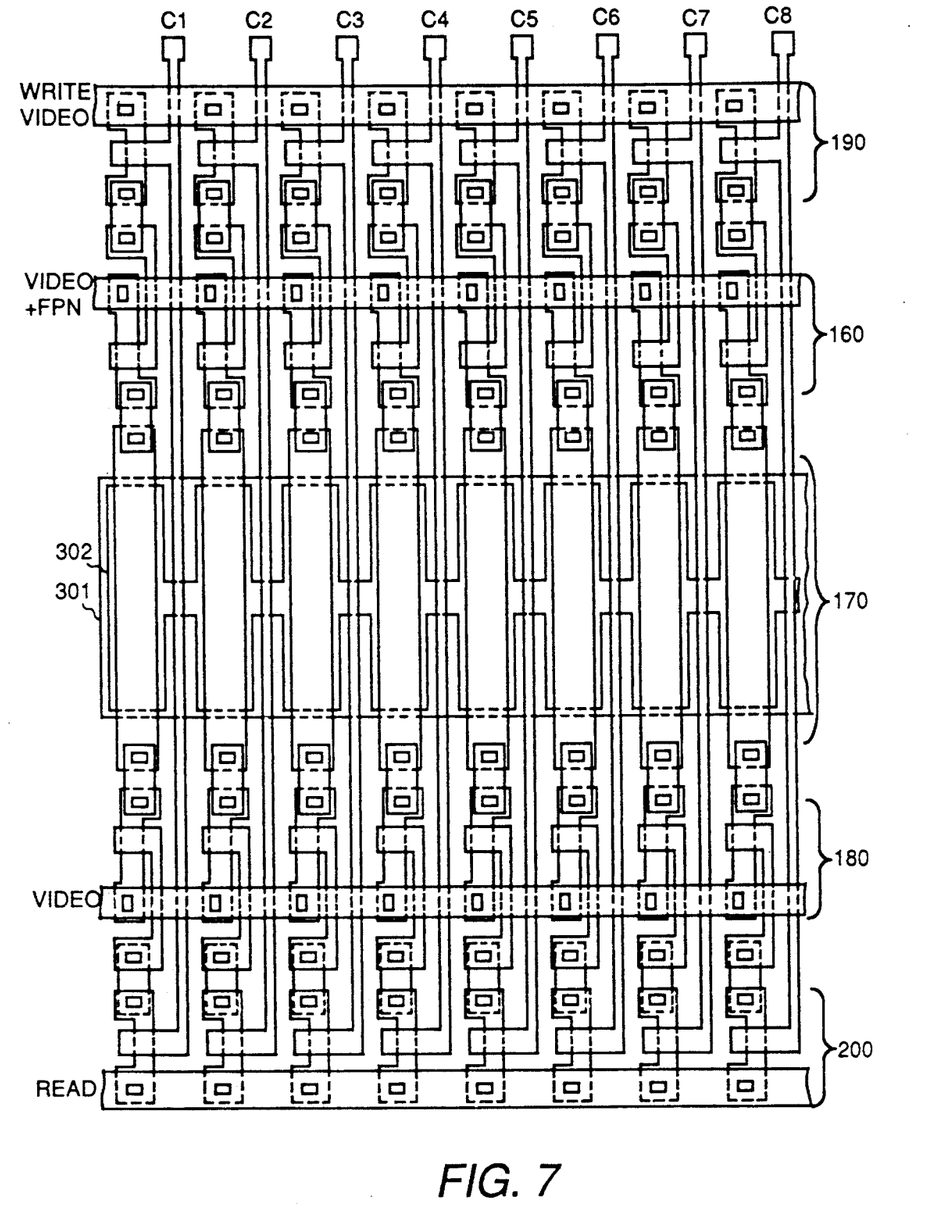
FIG. 7 is a diagram of the layout on the imager chip of a portion of the line storage apparatus shown in FIG. 2.

A layout on a semiconductor substrate of an eight-column segment of the analog line store 11 is shown in FIG. 7. The view is down onto the top surface (focal plane) of the semiconductor die. The register portion of the column scanner 13 is not shown, but is above the analog line store 11. The small boxes, which indicate vias etched through the oxide layers, are actually hidden from view by the top metallization; however, since these details are so small as to be difficult to show with dashed lines, these details are not shown as hidden lines. A bottom capacitor plate structure 301 extends from left to right in the central portion of FIG. 7; as indicated previously, the bottom capacitor plate structure 301 is a region of heavily doped n+ diffusion into the surface of the lightly-n-doped epitaxial layer formed concurrently with the regions of heavily doped n+ diffusion used for making top contacts with the epitaxial layer. An oxide layer is grown atop the bottom capacitor plate structure 301 at the same time as the 400 Å lower polysilicon MOS transistor gate oxide is grown and provides for a picket-fence shaped thin-oxide region 302 overlying the bottom capacitor plate structure 301. The bottom capacitor plate structure 301 and the thin-oxide region 302 thereover have a plurality 170 of top capacitor plates over them, which plates are formed at the same time as the heavily doped lower polysilicon gate conductors for the MOS transistors and column lines for the CID imager array 10 are formed.

Consider the portions of the structure associated with the write multiplexer 111. A row 160 of MOS field-effect transistor channels are formed in the epitaxial layer, to provide selective connection between the plurality 170 of top capacitor plates and the VIDEO+FPN bus formed from the top metallization layer. A row 190 of MOS field-effect transistor channels are formed in the epitaxial layer, to provide selective connection between the WRITE VIDEO bus formed from the top metallization layer and the gate electrodes associated with the row 160 of MOS field-effect transistor channels. The gate electrodes associated with the row 190 of MOS field-effect transistor channels connect to the column lines of the CID image sensing array 10 as extended through the column scanner 13.

Consider the portions of the structure associated with the read multiplexer 113. A row 180 of MOS field-effect transistor channels are formed in the epitaxial layer, to provide selective connection between the plurality 170 of top capacitor plates and the VIDEO bus formed from the top metallization layer. A row 200 of MOS field-effect transistor channels are formed in the epitaxial layer, to provide selective connection between the READ bus formed from the top metallization layer and the gate electrodes associated with the row 180 of MOS field-effect transistor channels. The gate electrodes associated with the row 200 of MOS field-effect transistor channels connect to the column lines of the CID image sensing array 10 as extended through the column scanner 13.

Fixed pattern noise can be a problem in other types of solidstate imagers such as charge-coupled-device (CCD) imagers of the line transfer type. Such a CCD imager uses a respective CCD register masked from impinging light for converting each line of parallel samples to serial samples and does not use a column scanner. The analog line store of the invention may be used in cancelling fixed pattern noise from such a CCD imager, however, though a scanner will have to be provided for generating control signals for the write and read multiplexers in the analog line store. The scanner can consist of a shift register clocked at pixel scan rate and reset during line retrace interval.

Reading the foregoing disclosure will enable one skilled in the art to design other embodiments of the invention, which should be borne in mind when construing the scope of the claims which follow.

What is claimed is:

1. A solid state imager including means for generating successive sequences of n analog samples supplied at a prescribed clocking rate, and a radiation tolerant analog delay line for delaying by n sample times those successive sequences of n analog samples supplied at a prescribed clocking rate, n being an integer at least fifty, said analog delay line comprising:
    an input terminal for receiving said successive sequences of analog samples supplied at a prescribed clocking rate;
    an output terminal for supplying said successive sequences of analog samples supplied at a prescribed clocking rate and delayed by n sample times;
    a bank of linear storage capacitors, n in number, having similar capacitances that are substantially invariant with change in stored charge;
    a 1:n write multiplexer for sampling successive regularly clocked analog samples sequentially to said n storage capacitors for temporary storage therein, as latter parts of sequential read-then-write operations;
    an n:1 read multiplexer for sequentially sampling with substantially equal delays said temporarily stored analog samples from said n storage capacitors; as earlier parts of sequential read-then-write operations; and
    a scanner for generating control signals for said write multiplexer and said read multiplexer at said prescribed clocking rate, for implementing said sequential read-then-write operations.

2. The solid state imager as set forth in claim 1 wherein said means for generating successive sequences of n analog samples supplied at a prescribed clocking rate comprises:
    a solid-state imager sequentially providing at a row scan rate pairs of concurrently generated lines of successive video samples, said successive samples in one line in each pair being generated by scanning a row of sensing elements before they are erased and said successive samples in the other line in that pair being concurrently generated by scanning a row of sensing elements after they are erased;
    means for operating said solid-state imager for sequentially providing said successive video samples in each line at a pixel element scan rate corresponding to said prescribed clocking rate;
    a first voltage amplifier for responding to the line of successive video samples generated by scanning a row of sensing elements before they are erased to generate first amplified samples; and means for performing a correlated double sampling of said first amplified samples to generate first correlated double sampling results applied to the input terminal of said analog delay line as said successive sequences of analog samples supplied at a prescribed clocking rate.

3. The solid state imager as set forth in claim 1 disposed within the confines of a monolithic integrated circuit on an epitaxial layer of a first conductivity type silicon grown on a substrate of a second conductivity type silicon, which epitaxial layer is highly doped in certain regions thereof to form the first plates of said bank of storage capacitors and is largely overlain by an oxide layer, said oxide layer having disposed thereon a polysilicon layer selectively etched away, the second plates of said bank of storage capacitors being formed by remnant portions of said polysilicon layer.

4. The solid state imager as set forth in claim 1 wherein each said storage capacitor in said analog delay line has a respective first plate connected to a point of reference potential, has a respective second plate, and exhibits between its first and second plates a respective capacitance of prescribed value; said combination further including:

a field effect transistor, having a gate electrode to which the output terminal of said analog delay line connects, and having a channel connected for supplying output signals linearly related to voltage between said point of reference potential and its gate electrode.

5. The solid state imager as set forth in claim 4 wherein said means for for supplying successive sequences of analog voltage samples comprises:

a solid-state imager sequentially providing at a row scan rate pairs of lines of successive video samples, one line generated by scanning a row of sensing elements before they are erased and the other line generated by scanning a row of sensing elements after they are erased;

means for operating said solid-state imager for sequentially providing said successive video samples in each line at a pixel element scan rate corresponding to said prescribed clocking rate;

a first voltage amplifier for responding to the line of successive video samples generated by scanning a row of sensing elements before they are erased to generate first amplified samples; and means for performing a correlated double sampling of said first amplified samples to generate first correlated double sampling results applied to the input terminal of said analog delay line as said successive sequences of analog voltage samples supplied at a prescribed clocking rate.

6. The solid state imager as set forth in claim 5 further including:

means for differentially combining samples supplied to the output terminal of said analog delay line and samples supplied to a fixed-pattern-noise terminal, thereby to generate video signal substantially free of fixed pattern noise;

a second voltage amplifier for responding to the line of successive video samples generated by scanning a row of sensing elements after they are erased to generate second amplified samples, said second voltage amplifier and said second voltage amplifier having similar voltage gains;

means for performing a correlated double sampling of said second amplified samples to generate second correlated double sampling results;

a further storage capacitor, having a capacitance that is substantially invariant with change in stored charge;

a first switching device for sampling successive second correlated double sampling results to said further storage capacitor as a latter part of a further read-then-write operation;

a second switching device for sequentially sampling from said further storage capacitor to said fixed-pattern-noise terminal as an earlier part of said further read-then-write operation.

7. The solid state imager as set forth in claim 6 wherein said solid-state imager includes a plurality of charge-injection devices arrayed by row and by column along row lines and column lines; wherein said solid-state imager includes a second scanner for sequentially selecting overlapping pairs of said row lines for reading from said solid-state imager respectively to said first voltage amplifier and to said second voltage amplifier; wherein said solid-state imager includes a third scanner for clamping to a direct potential the ones of said row lines not currently selected by said second scanner; and wherein said means for operating said solid-state imager for sequentially providing said successive video samples in each line at a pixel element scan rate corresponding to said prescribed clocking rate includes said first scanner connected for sequentially selecting ones of said column lines.

8. A combination comprising:

a solid-state imager sequentially providing at a row scan rate pairs of concurrently generated lines of successive video samples, said successive samples in one line in each pair being generated by scanning a row of sensing elements before they are erased and said successive samples in the other line in that pair being concurrently generated by scanning a row of sensing elements after they are erased;

means for operating said solid-state imager for sequentially providing n said successive video samples in each line at a pixel element scan rate corresponding to a prescribed clocking rate, n being a plural number;

a first voltage amplifier for responding to the line of successive video samples generated by scanning a row of sensing elements before they are erased to generate first amplified samples;

means for performing a correlated double sampling of said first amplified samples to generate corresponding samples of first correlated double sampling results;

an analog delay line for delaying said samples of first correlated double sampling results by the time for one of said scannings of said rows of sensing elements, said analog delay line comprising an input terminal for receiving said samples of first correlated double sampling results that are to be delayed, an output terminal for supplying said samples of first correlated double sampling results that are delayed, a bank n in number of storage capacitors having similar capacitances that are substantially invariant with change in stored charge, a 1:n write multiplexer for sampling said samples of first correlated double sampling results from said input terminal sequentially to said n storage capacitors as latter parts of sequential read-then-write operations, an n:1 read multiplexer for sequentially sampling as earlier parts of said sequential read-then-write operations said samples of first correlated double sampling results from said n storage capacitors to said output terminal as earlier parts of said sequential read-then-write operations, and a first scanner for generating control signals for said write multiplexer and said read multiplexer at said prescribed clocking rate to implement said sequential read-then-write operations;

a second voltage amplifier for responding to the line of successive video samples generated by scanning a row of sensing elements after they are erased to generate second amplified samples, said first voltage amplifier and said second voltage amplifier having similar voltage gains;

means for performing a correlated double sampling of said second amplified samples to generate corresponding samples of second correlated double sampling results;

means for differentially combining samples supplied from the output terminal of said analog delay line and said corresponding samples of second correlated double sampling results, thereby to generate video signal substantially free of fixed pattern noise;

a further storage capacitor, having a capacitance that is substantially invariant with change in stored charge;

a first switching device for sampling successive second correlated double sampling results to said further storage capacitor as a latter part of a further read-then-write operation; and a second switching device for sequentially sampling from said further storage capacitor to said fixed-pattern-noise terminal as an earlier part of said further read-then-write operation.

9. A combination as set forth in claim 3 wherein said solid-state imager includes a plurality of charge-injection devices arrayed by row and by column along row lines and column lines; wherein said solid-state imager includes a second scanner for sequentially selecting overlapping pairs of said row lines for concurrent reading from said solid-state imager respectively to said first voltage amplifier and to said second voltage amplifier; wherein said solid-state imager includes a third scanner for clamping to a direct potential the ones of said row lines not currently selected by said second scanner; and wherein said means for operating said solid-state imager for sequentially providing said successive video samples in each line at a pixel element scan rate corresponding to said prescribed clocking rate includes said first scanner connected for sequentially selecting ones of said column lines.

10. A semiconductor imager for use with first correlated double sampling apparatus, second correlated double sampling apparatus and differential combining apparatus; said semiconductor imager comprising, within the confines of a single semiconductor die:

a first terminal for connecting to said first correlated double sampling apparatus;

a second terminal for connecting from said first correlated double sampling apparatus;

a third terminal for connecting to said second correlated double sampling apparatus;

a fourth terminal for connecting from said second correlated double sampling apparatus;

a fifth terminal for connecting to an input port of said differential combining apparatus;

a sixth terminal for connecting to another input port of said differential combining apparatus;

first and second voltage amplifiers having respective input ports, having respective output ports respectively connecting to said first terminal and to said third terminal, and exhibiting similar voltage gains;

a charge-injection-device imager having a plurality m times n in number of charge-injection devices, having an array of parallel row lines respectively identified in order of their appearance in said array thereof by consecutive ordinal numbers first through $m^{th}$, and having an array of parallel column lines respectively identified in order of their appearance in said array thereof by consecutive ordinal numbers first through $n^{th}$, m and n being positive integers not necessarily different from each other, said array of parallel column lines crossing said array of parallel row lines, and a respective one of said charge-injection devices being located at each said crossing;

a row scan generator for sequentially addressing successive overlapping pairs of adjacent ones of said first through $m^{th}$ row lines for connection to respective ones of the input ports of said first and said second voltage amplifiers during read out from said charge-injection device imager, the addressing of each pair of row lines taking place during a respective row scan interval;

a column scan generator for sequentially addressing said first through $n^{th}$ column lines during read out via said first and said second output lines from each sequentially addressed pair of adjacent ones of said first through $m^{th}$ row lines, the addressing of each column line taking place during a respective column scan interval;

a clamp scan generator for clamping to fixed potential those row lines not addressed by said row scan generator during the current row scan interval;

a zeroeth capacitive storage device;

means for applying to said fifth terminal, during an earlier portion of each column scan interval, the potential across said zeroeth capacitive storage device, as a successive sample of said first signal;

means for charging said zeroeth capacitive storage device during a later portion of each column scan interval to the potential currently appearing at said second terminal;

a row of capacitive storage devices, n in number, respectively identified by consecutive ordinal numbers first through $n^{th}$, having respective first plates connected to receive a reference potential, having respective second plates, and exhibiting capacitances between their respective first and second plates that are similar to each other;

a read multiplexer responding to said column scan generator to apply to said sixth terminal, during an earlier portion of each column scan interval, the potential appearing on a successively scanned one of said first through $N^{th}$ capacitive storage devices to said sixth terminal; and a write multiplexer responding to said column scan generator to charge, during a later portion of each column scan interval, said successively scanned one of said first through $N^{th}$ capacitive storage devices to the potential currently appearing at said fourth terminal.

11. A semiconductor imager as set forth in claim 10, wherein said read multiplexer comprises a plurality of field-effect transistor switches, n in number, respectively identified by consecutive ordinal numbers first through $n^{th}$, each of said first through $n^{th}$ field-effect transistor switches having a respective channel connecting between said fourth terminal and the second plate of the one of said row of capacitive storage devices identified by the same ordinal number as that field-effect transistor switch, each of said first through $n^{th}$ field-effect transistor switches having a respective gate to which said column scan generator applies a switching signal; and wherein said write multiplexer comprises a plurality of field-effect transistor switches, n in number, respectively identified by consecutive ordinal numbers $(n+1)^{th}$ through $2n^{th}$, each of said $(n+1)^{th}$ through $2n^{th}$ field-effect transistor switches having a respective channel connecting between said sixth terminal and the second plate of the one of said row of capacitive storage devices identified by the same ordinal number as that field-effect transistor switch, each of said first through $n^{th}$ field-effect transistor switches having a respective gate to which said column scan generator applies a switching signal.

12. A semiconductor imager as set forth in claim 11 constructed to be tolerant of radiation; wherein said charge-injection device imager is constructed on an N-type silicon epitaxial layer, wherein said field-effect transistor switches comprise p-channel metal-oxide-silicon insulated-gate field-effect transistors; and wherein each said capacitive storage device uses as its first plate a heavily doped N+ top contact diffusion, uses as its second plate a heavily doped lower polysilicon layer also used for the gate electrodes of said field-effect transistor switches and uses as its dielectric a layer of oxide grown on the N+ top contact diffusion during the growth of oxide gate insulation for said field-effect transistor switches, thereby avoiding the use of oxide grown from a polysilicon layer as its dielectric.

13. A semiconductor imager as set forth in claim 10 in combination with first correlated double sampling apparatus, with second correlated double sampling apparatus, and with differential combining apparatus that generates image samples substantially free of fixed pattern noise.

14. A combination comprising:

a solid-state imager sequentially providing at a row scan rate pairs of concurrently generated lines of successive video samples, said successive samples in one line in each pair being generated by scanning at a prescribed clocking rate a row of sensing elements before they are erased, and said successive samples in the other line in that pair being concurrently generated by scanning at said prescribed clocking rate a row of sensing elements after they are erased;

a first voltage amplifier for responding to the line of successive video samples generated by scanning a row of sensing elements before they are erased to generate first amplified samples;

a second voltage amplifier for responding to the line of successive video samples generated by scanning a row of sensing elements after they are erased to generate second amplified samples, said first voltage amplifier and said second voltage amplifier having similar voltage gains;

an analog delay line having an input terminal for receiving a first stream of analog samples formed from said first amplified samples and having an output terminal for supplying a second stream of analog samples responding to said first stream of samples with delay equal to the time duration between successive ones of said scannings of rows of sensing elements; and means for generating video signals with reduced fixed pattern noise by differentially combining with said second stream of analog samples a third stream of analog samples formed from said second amplified samples.

15. A combination as set forth in claim 14 including:

means for performing a correlated double sampling of said first amplified samples in forming said first stream of analog samples; and means for performing a correlated double sampling of said second amplified samples in forming said third stream of analog samples.

* * * * *